(12) United States Patent
Zhang et al.

(10) Patent No.: US 8,011,066 B2
(45) Date of Patent: Sep. 6, 2011

(54) HINGE ASSEMBLY FOR ELECTRONIC DEVICE

(75) Inventors: Han-Zheng Zhang, Shenzhen (CN); Xiao-Bo Li, Shenzhen (CN); Jin-Xin Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 351 days.

(21) Appl. No.: 12/420,201

(22) Filed: Apr. 8, 2009

(65) Prior Publication Data

US 2010/0125975 A1 May 27, 2010

(30) Foreign Application Priority Data

Nov. 21, 2008 (CN) .............................. 200810305694

(51) Int. Cl.
*E05D 3/10* (2006.01)
*E05D 11/08* (2006.01)
(52) U.S. Cl. ................. 16/367; 16/330; 16/337; 16/340
(58) Field of Classification Search ..................... 16/367, 16/386, 338–340, 330, 303, 380, 334; 361/679.06, 361/679.27, 679.28, 679.11, 679.12, 679.13; 379/433.12, 433.13; 455/575.1, 575.4, 575.8, 455/550.1, 90.3; 348/373, 333.06, 794; 248/291.1, 248/292.12, 292.13, 919–923
See application file for complete search history.

(56) References Cited

U.S. PATENT DOCUMENTS

| 7,845,051 | B2 * | 12/2010 | Saito et al. ...................... 16/337 |
| 2003/0097732 | A1 * | 5/2003 | Kim ................................ 16/337 |
| 2004/0084578 | A1 * | 5/2004 | Cho et al. .................... 248/125.1 |
| 2005/0166365 | A1 * | 8/2005 | Hsieh .............................. 16/337 |
| 2006/0191104 | A1 * | 8/2006 | Cho et al. ........................ 16/340 |
| 2007/0119024 | A1 * | 5/2007 | Kim ................................ 16/337 |
| 2007/0136995 | A1 * | 6/2007 | Hu et al. ......................... 16/340 |
| 2008/0034551 | A1 * | 2/2008 | Jeong ............................. 16/367 |
| 2009/0121094 | A1 * | 5/2009 | Chang et al. ............... 248/125.7 |

FOREIGN PATENT DOCUMENTS

| GB | 2279105 A | * | 12/1994 |
| JP | 2002266841 A | * | 9/2002 |
| JP | 2005208428 A | * | 8/2005 |

* cited by examiner

*Primary Examiner* — Chuck Y. Mah
(74) *Attorney, Agent, or Firm* — Clifford O. Chi

(57) ABSTRACT

A hinge assembly includes a first connecting member, a second connecting member, and a pivot subassembly. The pivot subassembly connects the first connecting member to the second connecting member. The pivot subassembly includes a rotatable shaft, a sleeve, and a positioning ring. The rotatable shaft is non-rotatably connected to the first connecting member. The sleeve is sleeved on the rotatable shaft, and non-rotatably connected to the rotatable shaft. The positioning ring is non-rotatably connected to the second connecting member. The sleeve defines two positioning cutouts, and the positioning ring defines two positioning protrusions engaging with the positioning cutouts. When the rotatable shaft rotates, one of the sleeve and the positioning ring deforms, so that the at least one positioning protrusion disengages from the at least one positioning cutout.

17 Claims, 5 Drawing Sheets

HINGE ASSEMBLY FOR ELECTRONIC DEVICE

CROSS-REFERENCE STATEMENT

This application is related to four co-pending U.S. patent applications, application Ser. No. 12/267,716 filed on Nov. 10, 2008, entitled "DUAL-AXIS HINGE MECHANISM," application Ser. No. 12/327,644, filed on Dec. 3, 2008, entitled "HINGE ASSEMBLY FOR ELECTRONIC DEVICE," application Ser. No. 11/261,232, filed on Oct. 30, 2008, entitled "HINGE ASSEMBLY FOR AN ELECTRONIC DEVICE," and application Ser. No. 12/337,765, filed on Dec. 18, 2008, entitled "HINGE ASSEMBLY WITH RESTRICTING UNIT." The co-pending applications have the same assignee as the present application.

BACKGROUND

1. Technical Field

The present disclosure relates generally to hinge assemblies and, more particularly, to a hinge assembly for electronic device.

2. Description of Related Art

An electronic device such as a mobile phone, a notebook computer, or a personal digital assistant, generally has a main body and a cover with a display pivotally mounted on the main body via a typical hinge assembly.

The typical hinge assembly includes a base, a friction member, a stand, a cam, a cam follower, a plurality of spring washers, a plurality of flat washers, a fastening member, and a pivot shaft. The cam defines a plurality of positioning peaks. The cam follower defines a plurality of positioning valleys corresponding to the positioning peaks. The base is fixed to the main body of the electronic device. The stand is fixed to the cover of the electronic device. The spring washers provide an elastic force along the pivot shaft. One end of the pivot shaft is fixed to the stand, and the other end of the pivot shaft extends through the base, the friction member, the cam, the cam follower, the spring washers, the flat washers, and engages with the fastening member. The stand and the cam follower are non-rotatably connected to the pivot shaft, and the cam is fixed to the base.

However, the typical hinge assembly has a complex structure and many components. Therefore, the typical hinge assembly has a high manufacturing cost.

Therefore, a hinge assembly which overcomes the above-described shortcomings is desired.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

References will now be made to the drawings to describe certain inventive embodiments of the present disclosure in detail.

Figure 1:
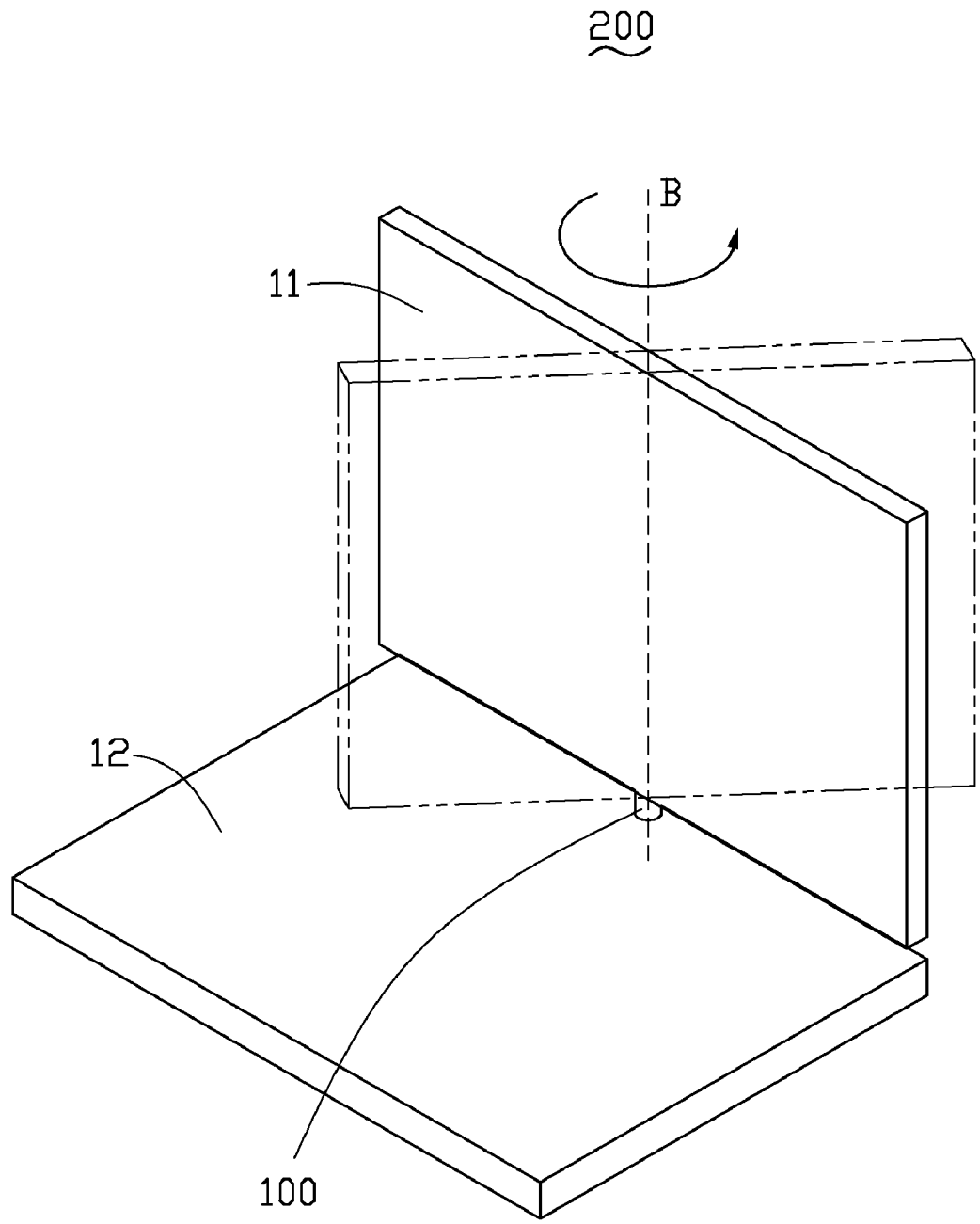
FIG. 1 is an isometric view of an electronic device using an embodiment of a hinge assembly.

Referring to FIG. 1, an embodiment of a hinge assembly 100 is applied in an electronic device 200. The electronic device 200 includes a cover 11 and a main body 12. The cover 11 is rotatably connected to the main body 12 via the hinge assembly 100. The cover 11 is rotatable on an axis B relative to the main body 12.

Figure 2:
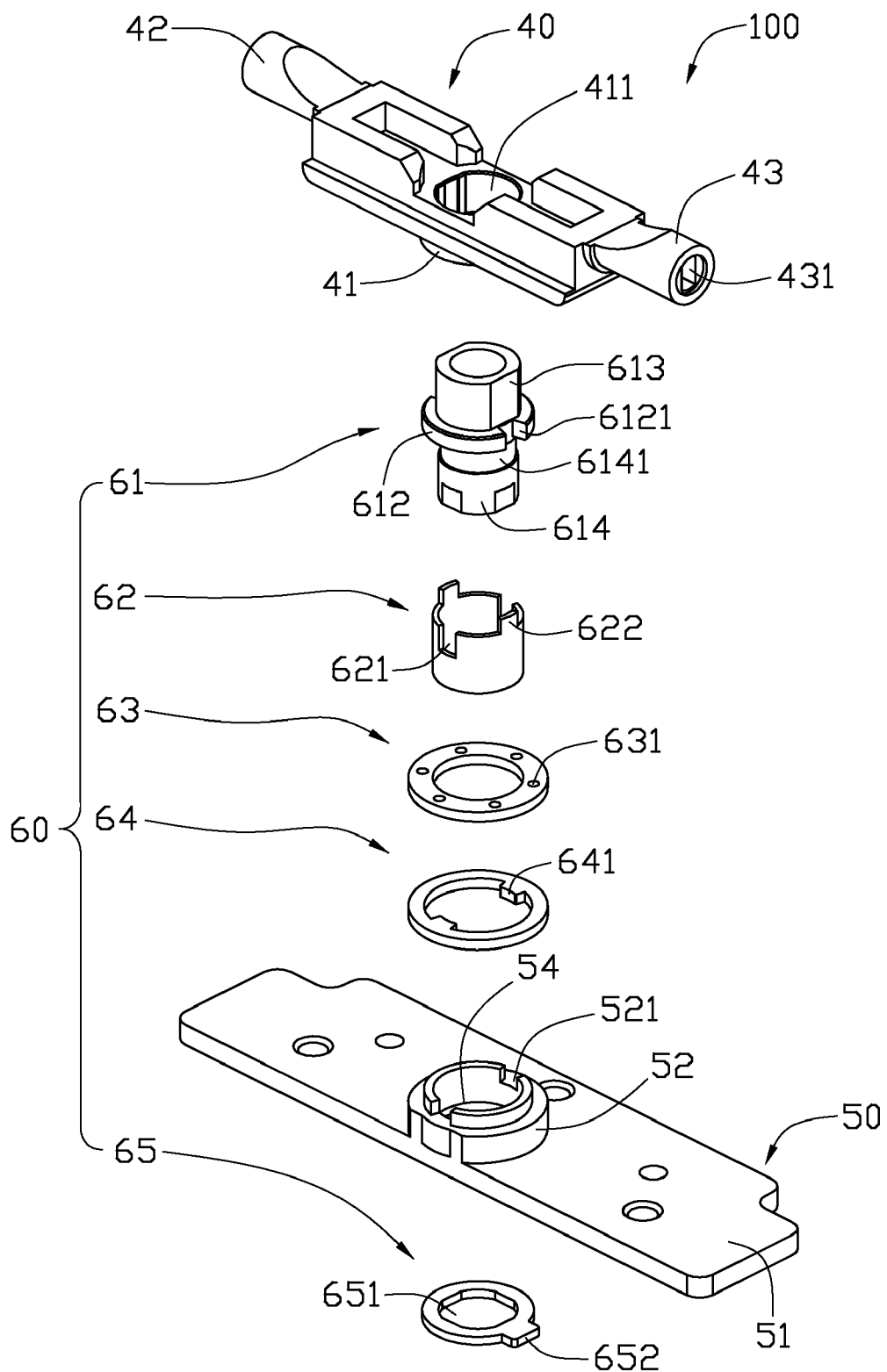
FIG. 2 is an exploded, isometric view of the hinge assembly of FIG. 1.
Figure 3:
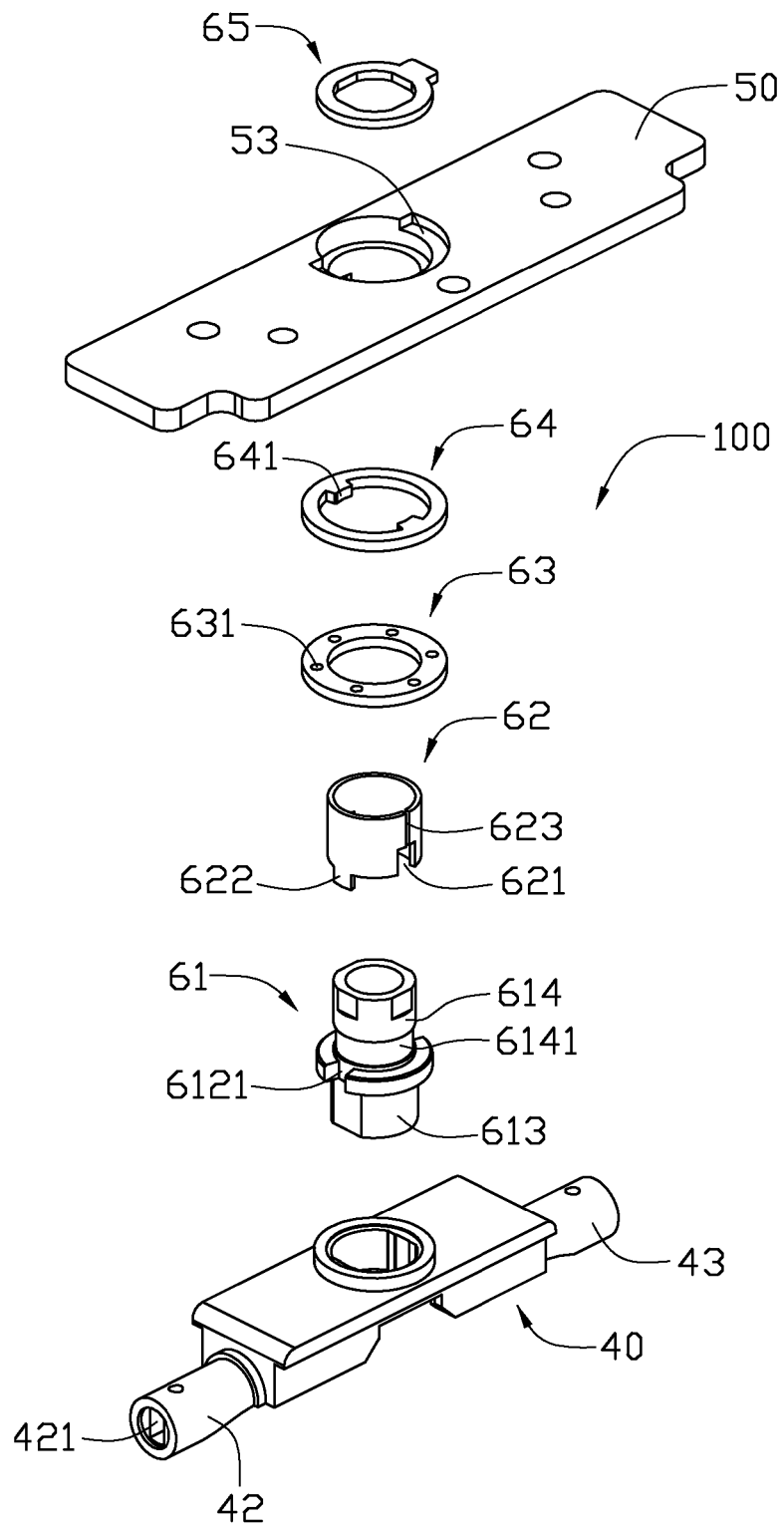
FIG. 3 is similar to FIG. 2, but viewed from another aspect.

Referring to FIGS. 2 and 3, the hinge assembly 100 includes a first connecting member 40, a second connecting member 50, and a pivot subassembly 60. The pivot subassembly 60 connects the first connecting member 40 to the second connecting member 50. The first connecting member 40 is configured for connecting with the cover 11, and the second connecting member 50 is configured for connecting with the main body 12.

The first connecting member 40 includes a main portion 41, a first connecting portion 42, and a second connecting portion 43. The first connecting portion 42 and the second connecting portion 43 extend from opposite ends of the main portion 41. The main portion 41 defines a non-circular pivot hole 411 for sleeving on the pivot subassembly 60. The first connecting portion 42 defines an assembling hole 421. The second connecting portion 43 defines an assembling hole 431.

The second connecting member 50 includes a fixing plate 51. A center of the fixing plate 51 defines a substantially circular through hole 54. A ring portion 52 is formed on a first surface of the fixing plate 51 around the through hole 54. The ring portion 52 defines two positioning cutouts 521 opposite to each other. A restricting groove 53 is defined in a second surface of the fixing plate 51 opposite to the first surface around the through hole 54.

The pivot subassembly 60 includes a rotatable shaft 61, a sleeve 62, a friction member 63, a positioning ring 64, and a restricting member 65.

The rotatable shaft 61 includes a flange 612, an assembling portion 613, and a pivot portion 614. The assembling portion 613 and the pivot portion 614 extend from opposite sides of the flange 612. The flange 612 defines two positioning grooves 6121 in a periphery. The assembling portion 613 is shaped to be non-rotatably received in the pivot hole 411 of the first connecting member 40. The pivot portion 614 defines an annular groove 6141 adjacent to the flange 612.

The sleeve 62 defines two positioning cutouts 621 opposite to each other in a first end. Two positioning pieces 622 opposite to each other are formed on the first end. The positioning pieces 622 engage with the positioning grooves 6121 of the rotatable shaft 61. The sleeve 62 also defines a cutout 623 communicating with one of the positioning cutouts 621. In the illustrated embodiment, the sleeve is cylindrical.

The friction member 63 defines a plurality of oil holes for receiving lubricating oil. The friction member 63 also defines a central hole (not labeled) having a shape corresponding to the pivot portion 614 of the rotatable shaft 61.

The positioning ring 64 forms two positioning protrusions 641 opposite to each other on an inner surface thereof. The positioning protrusions 641 engage in the positioning cutouts 521 of the second connecting member 50.

The restricting member 65 defines a non-circular through hole 651 in a center portion, corresponding to a cross-section of a shape of the pivot portion 614 of the rotatable shaft 61. A restricting protrusion 652 is formed on the restricting member 65, and is received in the restricting groove 53 of the second connecting member 50.

Figure 4:
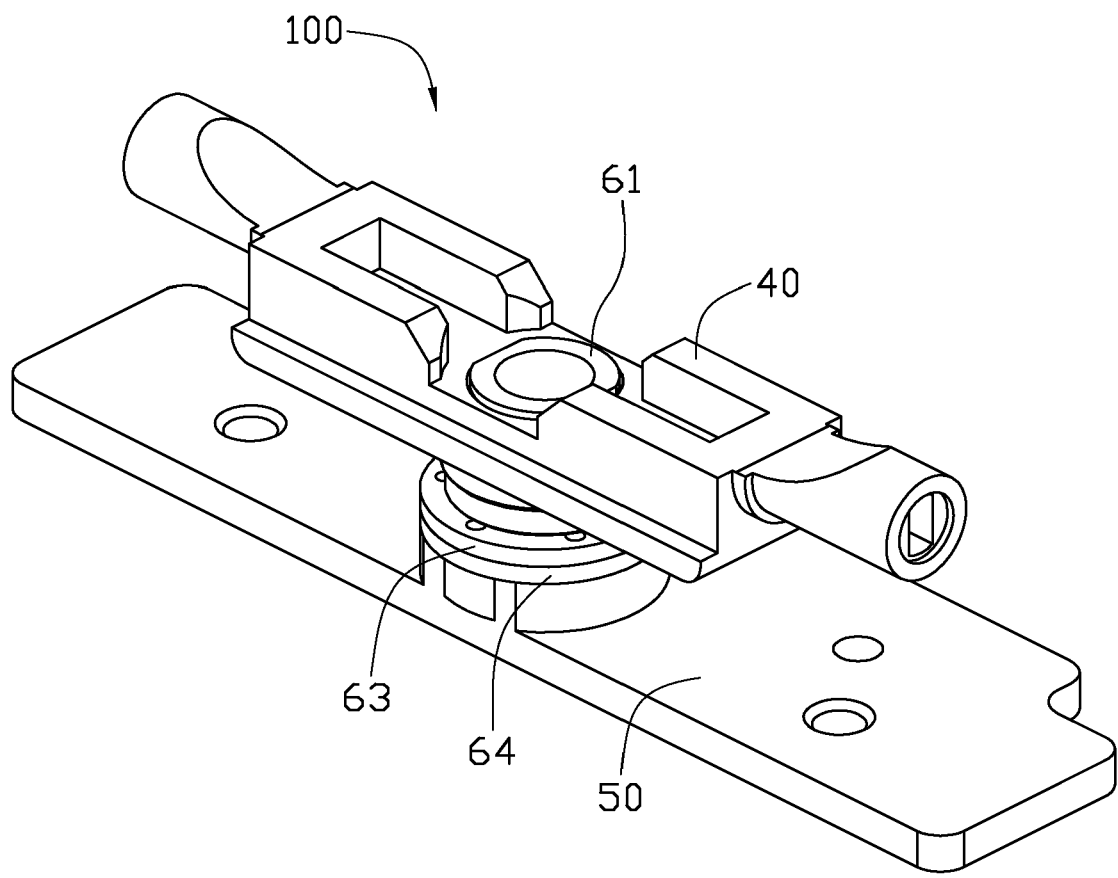
FIG. 4 is an assembled, isometric view of the hinge assembly of FIG. 2.
Figure 5:
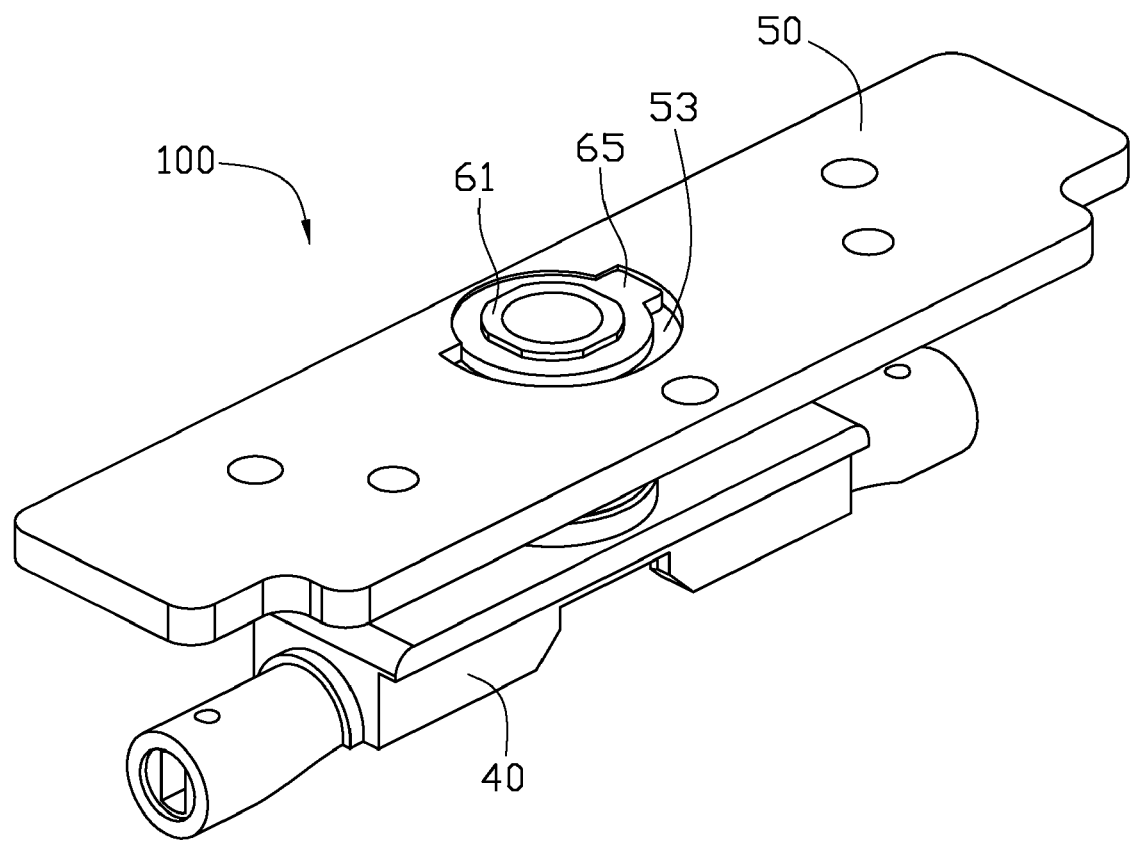
FIG. 5 is similar to FIG. 4, but viewed from another aspect.

Referring to FIGS. 4 and 5, in assembling the hinge assembly 100, the assembling portion 613 of the rotatable shaft 61 engages in the pivot hole 411 of the first connecting member 40. The pivot portion 614 of the rotatable shaft 61 extends through the sleeve 62, the friction member 63, the positioning ring 64, the second connecting member 50, and the restricting member 65. The sleeve 62 is sleeved on the rotatable shaft 61, and the positioning pieces 622 of the sleeve 62 engage in the positioning grooves 6121 of the rotatable shaft 61. The positioning ring 64 is sleeved on the ring portion 52 of the second connecting member 50, and the positioning protrusions 641 engage in the positioning cutouts 521 of the ring portion 52. The positioning protrusions 641 further engage in the positioning cutouts 621 of the sleeve 62. The restricting member 65 is received in the through hole 54 of the second connecting member 50, and the restricting protrusion 652 of the restricting member 65 is slidably received in the restricting groove 53. The sleeve 62 is then non-rotatably connected to the rotatable shaft 61, and the positioning ring 64 is non-rotatably connected to the second connecting member 50.

In use, the cover 11 is rotatable relative to the main body 12 (as shown in FIG. 1). The first connecting member 40 together with the rotatable shaft 61 rotates with the cover 11. Since the sleeve 62 is non-rotatably connected to the rotatable shaft 61, and a top portion of the sleeve 62 including the positioning pieces 622 can contract into the annular groove 6141 of the rotatable shaft 61, the positioning protrusions 641 of the positioning ring 64 disengage from the positioning cutouts 621 of the sleeve 62 and resist the cylindrical surface of the sleeve 62. The sleeve 62 is now elastically deformed. When the cover 11 rotates through a predetermined angle, the positioning protrusions 641 of the positioning ring 64 engage in the positioning cutouts 621 of the sleeve 62 again, so that the rotatable shaft 61 is thereby fixed at a position corresponding to the predetermined angle. When the restricting protrusion 652 of the restricting member 65 resists an end of the restricting groove 53, the cover 11 is prevented from rotating.

The cover 11 of the electronic device 200 using the hinge assembly 100 can be positioned via an engagement of the sleeve 62 and the positioning ring 64. Therefore, the hinge assembly 100 does not need a cam, cam follower, or spring washers employed in the typical hinge assembly. The hinge assembly 100 has a simple structure and therefore, a lower manufacturing cost.

It should be pointed out that a rotating subassembly may be positioned on the first connecting portion 42 or the second connecting portion 43, so that the cover 11 can be turned relative to the main body 12. In addition, the positioning ring 64 of the hinge assembly 100 can be omitted, and the positioning protrusions 641 can be formed on the second connecting member 50 around the through hole 54. The annular groove 6141 of the rotatable shaft 61 can also be omitted, but a diameter of the sleeve 62 should be slightly larger than that of the pivot portion 614 of the rotatable shaft 61. The sleeve 62 may not define the cutout 623, however, the positioning ring 64 should be elastic, so that it can be deformed in a rotating process. In addition, the sleeve 62 may define one positioning cutout 621 or more than two positioning cutouts 621, and the positioning ring 64 may define one positioning protrusion 641 or more than two positioning protrusions 641.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A hinge assembly, comprising:
a first connecting member;
a second connecting member; and
a pivot subassembly connecting the first connecting member to the second connecting member, the pivot subassembly comprising:
a rotatable shaft non-rotatably connected to the first connecting member;
a sleeve sleeved on the rotatable shaft and non-rotatably connected to the rotatable shaft; and
a positioning ring non-rotatably connected to the second connecting member;
wherein the sleeve defines at least one positioning cutout; the positioning ring defines at least one positioning protrusion engaging with the at least one positioning cutout; when the rotatable shaft rotates, at least one of the sleeve and the positioning ring deforms, so that the at least one positioning protrusion disengages from the at least one positioning cutout.

2. The hinge assembly of claim 1, wherein a diameter of the sleeve is larger than that of the rotatable shaft.

3. The hinge assembly of claim 1, wherein the rotatable shaft defines an annular groove to engage with the sleeve.

4. The hinge assembly of claim 3, wherein the sleeve further defines a cutout communicating with one of the at least one positioning cutout, to enhance elastic deforming of said sleeve.

5. The hinge assembly of claim 1, wherein the rotatable shaft comprises a flange, the flange defines at least one positioning groove; at least one positioning piece is formed on an end of the sleeve; the at least one positioning piece engages in the at least one positioning groove of the rotatable shaft, to non-rotatably connect the sleeve to the rotatable shaft.

6. The hinge assembly of claim 1, further comprising a restricting member non-rotatably connected to the shaft and having a restricting protrusion; the second connecting member defines a restricting groove; the restricting protrusion is slidably received in the restricting groove of the second connecting member.

7. The hinge assembly of claim 1, further comprising a friction member sleeved on the rotatable shaft.

8. The hinge assembly of claim 7, wherein the friction member defines a plurality of oil holes for receiving lubricating oil.

9. The hinge assembly of claim 1, wherein a ring portion is formed on the second connecting member, the ring portion defines at least one positioning cutout; the at least one positioning protrusion of the positioning ring extends through the at least one positioning cutout of the ring portion to non-rotatably connect the positioning ring to the second connecting member.

10. A hinge assembly, comprising:
a first connecting member;
a second connecting member; and
a pivot subassembly connecting the first connecting member to the second connecting member, the pivot subassembly comprising:
a rotatable shaft, one end of the rotatable shaft being non-rotatably connected to the first connecting member, and the other end of the rotatable shaft being rotatably connected to the second connecting member; and
a sleeve sleeved on the rotatable shaft and non-rotatably connected to the rotatable shaft;
wherein the sleeve defines at least one positioning cutout; the second connecting member defines at least one positioning protrusion engaging with the at least one positioning cutout; when the rotatable shaft rotates, the sleeve deforms, so that the at least one positioning protrusion disengages from the at least one positioning cutout of the sleeve.

11. The hinge assembly of claim 10, wherein a diameter of the sleeve is larger than that of the rotatable shaft.

12. The hinge assembly of claim 10, wherein the rotatable shaft defines an annular groove to engage with the sleeve.

13. The hinge assembly of claim 12, wherein the sleeve further defines a cutout communicating with one of the at least one positioning cutout, to enhance elastic deforming of said sleeve.

14. The hinge assembly of claim 10, wherein the rotatable shaft comprises a flange, the flange defines at least one positioning groove; at least one positioning piece is formed on an end of the sleeve; the at least one positioning piece engages in the at least one positioning groove of the rotatable shaft to non-rotatably connect the sleeve to the rotatable shaft.

15. The hinge assembly of claim 10, further comprising a restricting member non-rotatably connected to the shaft and having a restricting protrusion; the second connecting member defines a restricting groove; the restricting protrusion is slidably received in the restricting groove of the second connecting member.

16. The hinge assembly of claim 10, further comprising a friction member sleeved on the rotatable shaft.

17. The hinge assembly of claim 16, wherein the friction member defines a plurality of oil holes for receiving lubricating oil.

* * * * *